US009803074B2

(12) United States Patent
Botros et al.

(10) Patent No.: US 9,803,074 B2
(45) Date of Patent: Oct. 31, 2017

(54) POLYOLEFIN-BASED COMPOSITIONS, ADHESIVES, AND RELATED MULTI-LAYERED STRUCTURES PREPARED THEREFROM

(71) Applicants: Equistar Chemicals, LP, Houston, TX (US); Basell Poliolefine Italia S.r.l., Milan (IT)

(72) Inventors: Maged G. Botros, Liberty Township, OH (US); Enrico Costantini, Ferrara (IT); Charles S. Holland, Springboro, OH (US); Chun Lee, Cincinnati, OH (US); Enrico Masarati, Ferrara (IT)

(73) Assignees: Equistar Chemicals, LP, Houston, TX (US); Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 14/645,488

(22) Filed: Mar. 12, 2015

(65) Prior Publication Data
US 2015/0267087 A1 Sep. 24, 2015

Related U.S. Application Data

(60) Provisional application No. 61/968,825, filed on Mar. 21, 2014.

(51) Int. Cl.
*C08L 23/10* (2006.01)
(52) U.S. Cl.
CPC .......... *C08L 23/10* (2013.01); *C08L 2203/16* (2013.01)
(58) Field of Classification Search
CPC .......... C08L 23/10; C08L 23/12; C08L 23/14; C08L 23/142; C08L 23/16; C08L 2201/10; C08L 2203/16; C08L 2205/03; C08L 2205/035; C08L 2207/02; C08L 2207/04
See application file for complete search history.

(56) References Cited

U.S. PATENT DOCUMENTS

| | | | |
|---|---|---|---|
| 3,697,465 A * | 10/1972 | Joyner | C08L 23/10 428/461 |
| 5,367,022 A * | 11/1994 | Kiang | B32B 27/08 428/461 |
| 5,439,974 A * | 8/1995 | Mattson | B32B 27/08 525/193 |
| 5,486,561 A * | 1/1996 | Hirano | C08K 5/06 524/288 |
| 7,541,402 B2 | 6/2009 | Abhari et al. | |
| 7,932,323 B1 * | 4/2011 | Botros | B32B 27/08 525/221 |
| 7,964,672 B2 * | 6/2011 | Ouhadi | C08L 23/16 524/401 |
| 8,298,660 B2 * | 10/2012 | Ishiguro | C08L 23/02 428/343 |
| 8,530,577 B2 | 9/2013 | Li et al. | |
| 8,563,138 B2 * | 10/2013 | Yasui | B32B 7/12 428/500 |
| 8,637,159 B2 * | 1/2014 | Botros | B32B 7/12 428/516 |
| 8,653,169 B2 | 2/2014 | Jiang et al. | |
| 8,673,451 B2 * | 3/2014 | Botros | B32B 27/08 264/210.7 |
| 8,940,837 B2 | 1/2015 | Ceccarani et al. | |
| 2003/0092844 A1 * | 5/2003 | Pradel | C09J 123/10 525/208 |
| 2004/0034166 A1 * | 2/2004 | Botros | C08F 255/02 525/192 |
| 2012/0077048 A1 * | 3/2012 | Botros | B32B 7/12 428/516 |
| 2013/0260064 A1 * | 10/2013 | Botros | B32B 7/12 428/34.1 |
| 2013/0317173 A1 | 11/2013 | Li et al. | |
| 2014/0163154 A1 * | 6/2014 | Shipley | C08L 23/10 524/494 |

FOREIGN PATENT DOCUMENTS

| | | | | |
|---|---|---|---|---|
| CN | 101948586 A1 * | 1/2011 | | C08K 13/02 |
| EP | 0884357 A1 | 12/1998 | | |
| WO | WO-2014025982 A1 | 2/2014 | | |

OTHER PUBLICATIONS

PCT International Search Report and the Written Opinion—dated Jun. 26, 2015 (Jun. 26, 2015) for Corresponding PCT/US2015/020071.

* cited by examiner

Primary Examiner — Rip A Lee

(57) ABSTRACT

The present disclosure provides a polyolefin-based composition suitable for use as adhesives and/or tie-layer adhesive compositions as well as a multi-layered structure made from and/or containing the polyolefin-based composition. The polyolefin-based composition is made from and/or contains (a) a grafted polyolefin composition, (b) a first polymer composition, (c) a polypropylene-containing blend composition, and (d) optionally, an additives composition having one or more additives.

3 Claims, No Drawings

POLYOLEFIN-BASED COMPOSITIONS, ADHESIVES, AND RELATED MULTI-LAYERED STRUCTURES PREPARED THEREFROM

FIELD OF THE INVENTION

The present disclosure relates to polyolefin-based compositions useful as adhesives and/or tie-layer adhesive compositions for multi-layered structures. In particular, the compositions are useful as adhesives to bind a barrier layer to a dissimilar substrate.

DESCRIPTION OF RELATED ART

Multi-layer films and sheets are widely used for food packaging applications. Depending on the intended application, the number and arrangement of resin layers and the type of resins employed will vary. Polyethylene resins are often included as one of the layers for food contact and sealing properties. Ethylene-vinyl alcohol (EVOH) copolymers and polyamides (nylons) are widely used as oxygen and moisture barrier layers. Styrenic polymers are commonly included as structural layers, especially for thermoforming applications. However, adhering dissimilar resin layers in multilayer films and sheets is always challenging.

Improved tie-layer adhesive compositions suitable for use in making multi-layer structures with good adhesion and high clarity are needed. A valuable approach would avoid expensive additives and performance tradeoffs. Ideally, improved tie-layer adhesives could be made using economical starting materials, commonly-used equipment, and familiar techniques.

In addition to food packaging applications, adhesive compositions may be used in the preparation of pipes, geomembranes, containers, automotive parts, and wire and cable insulations and jackets.

SUMMARY OF THE INVENTION

In general embodiments, the present disclosure provides a polyolefin-based composition made from and/or containing a grafted polyolefin composition, a first polymer composition, and a polypropylene-containing blend composition. In some embodiments, the polyolefin-based composition is further made from and/or to contain an additives composition.

In particular embodiments, (a) the grafted polyolefin composition is made from and/or contains a polyolefin grafted with an unsaturated monomer, (b) the first polymer composition is made from and/or contains a first polyolefin polymer, and (c) the polypropylene-containing blend composition is made from and/or contains a polypropylene-containing blend.

In particular embodiments, the polypropylene-containing blend is made from and/or contains:
(a) from about 10 to about 90 weight percent a semicrystalline polypropylene and
(b) from about 10 to about 90 weight percent an ethylene propylene rubber having a total content of ethylene-derived units in an amount from about 20 to about 65 weight percent, based upon the total weight of the ethylene propylene rubber.
In more particular embodiments, the ethylene propylene rubber of the polypropylene-containing blend can be an interpolymer further comprising one or more additional $C_4$ to $C_{10}$ α-olefins.

In some embodiments, the present disclosure provides an adhesive made from and/or containing a polyolefin-based composition. In particular embodiments, the polyolefin-based composition is made from and/or contains
(a) from about 1 to about 30 weight percent of a grafted polyolefin composition, relative to the total weight of the polyolefin-based composition, comprising a polyolefin grafted with an unsaturated monomer,
(b) from about 10 to about 80 weight percent of a first polymer composition, relative to the total weight of the polyolefin-based composition, comprising a first polyolefin polymer,
(c) from about 10 to about 40 weight percent of a polypropylene-containing blend composition, relative to the total weight of the polyolefin-based composition, comprising a polypropylene-containing blend, and
(d) optionally, an additives composition having one or more additives.

In some embodiments, the present disclosure provides a multi-layered structure made from and/or containing a tie-layer adhesive, wherein the tie-layer adhesive is made from and/or contains a polyolefin-based composition.

DETAILED DESCRIPTION

The present invention now will be described more fully hereinafter. However, this invention may be embodied in many different forms and should not be construed as limited to the embodiments set forth herein; rather, these embodiments are provided so that this disclosure will satisfy applicable legal requirements. As such, it will be apparent to those skilled in the art that the embodiments may incorporate changes and modifications without departing from the general scope of this invention. It is intended to include all such modifications and alterations in so far as they come within the scope of the appended claims or the equivalents thereof.

As used in this specification and the claims, the singular forms "a," "an," and "the" include plural referents unless the context clearly dictates otherwise.

As used in this specification and the claims, the terms "comprising," "containing," or "including" mean that at least the named compound, element, material, particle, or method step, etc., is present in the composition, the article, or the method, but does not exclude the presence of other compounds, elements, materials, particles, or method steps, etc., even if the other such compounds, elements, materials, particles, or method steps, etc., have the same function as that which is named, unless expressly excluded in the claims. It is also to be understood that the mention of one or more method steps does not preclude the presence of additional method steps before or after the combined recited steps or intervening method steps between those steps expressly identified.

Moreover, it is also to be understood that the lettering of process steps or ingredients is a convenient means for identifying discrete activities or ingredients and the recited lettering can be arranged in any sequence, unless expressly indicated.

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Definitions

In the present description, the term "additives composition" refers to a composition made from and/or containing at least one additive.

In the present description, the terms "adhesive layer" and "tie layer" mean a layer or material placed on one or more substrates to promote the adhesion of that substrate to another layer. Preferably, adhesive layers are positioned between two layers of a multilayer structure to maintain the two layers in position relative to each other and prevent undesirable delamination.

In the present description, the term "α-olefin" or "alpha-olefin" means an olefin of formula $CH_2=CH-R$, wherein R is a linear or branched alkyl containing from 1 to 10 carbon atoms. The α-olefin can be selected, for example, from: propylene, 1-butene, 1-pentene, 1-hexene, 1-octene, 1-dodecene and the like.

In the present description, the term "amorphous" in reference to a polyolefin means olefinic polymer having a crystallinity from 0.001 to about 5 weight percent, based upon the total weight of the olefinic polymer.

In the present description, the term "first polymer composition" refers to a composition made from and/or containing at least a first polyolefin polymer.

In the present description, the term "crystalline" in reference to a polyolefin means olefinic polymer having a crystallinity of more than about 70 weight percent and less than about 93 weight percent, based upon the total weight of the olefinic polymer.

In the present description, the term "elastomer" refers to polymer compounds having rubber-like properties and crystallinity from 0.01 to about 10 percent, more preferably from about 0.01 to about 5 percent, and most preferably about 0.01 percent.

In the present description, the term "grafted polyolefin" refers to a polyolefin grafted with an unsaturated monomer. The unsaturated monomer is typically an unsaturated polar monomer, preferably containing one or more oxygen atoms. Preferred examples of such unsaturated monomers will be given hereinafter.

In the present description, the term "grafted polyolefin composition" refers to a composition made from and/or containing at least one grafted polyolefin.

In the present description, the term "highly crystalline" in reference to a polyolefin means olefinic polymer having a crystallinity from about 93 to about 100 weight percent, based upon the total weight of the olefinic polymer.

In the present description, the term "homopolymer" and similar terms mean a polymer consisting solely or essentially all of units derived from a single kind of monomer, e.g., ethylene homopolymer is a polymer comprising solely or essentially all of units derived from ethylene, propylene homopolymer is a polymer comprising solely or essentially all of units derived from propylene, and the like.

In the present description, the term "interpolymer" means a polymer prepared by the polymerization of at least two types of monomers or comonomers. It includes, but is not limited to, copolymers (which usually refers to polymers prepared from two different types of monomers or comonomers, although it is often used interchangeably with "interpolymer" to refer to polymers made from three or more different types of monomers or comonomers), terpolymers (which usually refers to polymers prepared from three different types of monomers or comonomers), tetrapolymers (which usually refers to polymers prepared from four different types of monomers or comonomers), and the like.

In the present description, the terms "monomer" and "comonomer" are used interchangeably. The terms mean any compound with a polymerizable moiety that is added to a reactor in order to produce a polymer. In those instances in which a polymer is described as comprising one or more monomers, e.g., a polymer comprising propylene and ethylene, the polymer, of course, comprises units derived from the monomers, e.g., $-CH_2-CH_2-$, and not the monomer itself, e.g., $CH_2=CH_2$.

In the present description, "plastic packaging" is of particular concern and discussed throughout this description. To facilitate that discussion, various polymer acronyms are used herein; they are recited below. When referring to blends of polymers, the description may use a colon (:) to indicate that the components to the left and right of the colon are blended. When referring to multilayer structure, the description may use a slash "/" to indicate that components to the left and right of the slash are in different layers and the relative position of components in layers may be so indicated by use of the slash to indicate layer boundaries.

Acronyms commonly employed herein include:
EAA: Copolymer of ethylene with acrylic acid
EAO: Copolymers of ethylene with at least one alpha-olefin
EBA: Copolymer of ethylene with butyl acrylate
EEA: Copolymer of ethylene with ethyl acrylate
EMA: Copolymer of ethylene with methyl acrylate
EMAA: Copolymer of ethylene with methacrylic acid
EVA: Copolymer of ethylene with vinyl acetate
EVOH: A saponified or hydrolyzed copolymer of ethylene and vinyl acetate
PB: Polybutylene-1 (a butylene homopolymer and/or copolymer of a major portion of butylene-1 with one or more alpha-olefins)
PE: Polyethylene (an ethylene homopolymer and/or copolymer of a major portion of ethylene with one or more alpha-olefins)
PP: Polypropylene homopolymer or copolymer
PET: Polyethylene terephthalate
PETG: Glycol-modified polyethylene terephthalate
PLA: Polylactic acid
PVDC: Polyvinylidene chloride (also includes copolymers of vinylidene chloride, especially with vinyl chloride and/or methyl acrylate (MA)).

In the present description, the term "polymer" means a macromolecular compound prepared by polymerizing monomers of the same or different type. The term "polymer" includes homopolymers, copolymers, terpolymers, interpolymers, and so on.

In the present description, the term "polyolefin" is used herein broadly to include polymers such as polyethylene, ethylene-alpha olefin copolymers (EAO), polypropylene, polybutene, and ethylene copolymers having a majority amount by weight of ethylene polymerized with a lesser amount of a comonomer such as vinyl acetate, and other polymeric resins within the "olefin" family classification.

Polyolefins may be made by a variety of processes well known in the art including batch and continuous processes using single, staged or sequential reactors, slurry, solution, and fluidized bed processes and one or more catalysts including for example, heterogeneous and homogeneous systems and Ziegler, Phillips, metallocene, single-site, and constrained geometry catalysts to produce polymers having different combinations of properties. Such polymers may be highly branched or substantially linear and the branching, dispersity, and average molecular weight may vary depending upon the parameters and processes chosen for their manufacture in accordance with the teachings of the polymer arts.

In the present description and with regard to polyethylene, the polymer can be classified as linear low-density polyethylene (LLDPE) having a density from about 0.910 to about 0.925 grams per cubic centimeter, low-density polyethylene (LDPE) also having a density from about 0.910 to about 0.925 grams per cubic centimeter, medium-density polyethylene (MDPE) having a density from about 0.926 to about 0.940 grams per cubic centimeter, and high-density polyethylene (HDPE) having a density from about 0.941 to about 0.970 grams per cubic centimeter.

In the present description, the term "polypropylene-containing blend composition" refers to a composition made from and/or containing at least one polypropylene-containing blend.

In the present description, the term "room temperature" refers to a temperature around 25 degrees Celsius.

In the present description, the term "semiamorphous" in reference to a polyolefin means olefinic polymer having a crystallinity of from about 5 to about 30 weight percent, based upon the total weight of the olefinic polymer.

In the present description, the term "semicrystalline" in reference to a polyolefin means olefinic polymer having a crystallinity of more than about 30 weight percent and less than about 70 weight percent, based upon the total weight of the olefinic polymer.

In the present description, the term "thermoplastic polymer" means a polymer that softens when exposed to heat and returns to its original condition when cooled to room temperature.

Testing

ASTM D 1238 is entitled "Test Method for Melt Flow Rates of Thermoplastics by Extrusion Plastometer." The term "ASTM D 1238" as used herein refers to the standard test method for determining melt flow rates of thermoplastics by extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Feb. 1, 2012 and published March 2012, the contents of which are incorporated herein by reference in its entirety. For the referenced ASTM standards, visit the ASTM website, www.astm.org, or contact ASTM Customer Service at service@astm.org.

ASTM D 1876 is entitled "Standard Test Method for Peel Resistance of Adhesives (T-Peel Test)." The term "ASTM D 1876" as used herein refers to a test method for determining the relative peel resistance of adhesive bonds between flexible adherends by means of a T-type specimen. The accuracy of the results of strength tests of adhesive bonds will depend on the conditions under which the bonding process is carried out. This test method was approved on Oct. 10, 2001 and published December 2001, the contents of which are incorporated herein by reference in its entirety. For the referenced ASTM standards, visit the ASTM website, www.astm.org, or contact ASTM Customer Service at service@astm.org.

The force required to separate the layers apart in a T-peel configuration at 25.4 cm (10 inches)/min is measured using an INSTRON™ tensile tester. The average adhesion of five specimens is recorded as the peel strength in kg/cm (lb/in).

Incorporated Unsaturated Monomer (Weight Percent): The amount of the unsaturated monomer incorporated into the grafted polyolefin can be measured by wet chemical methods (titration, etc.) or more preferably, by Fourier transform infrared spectroscopy (FTIR), according to methods that are well known in the art.

ISO 1133 is entitled "Plastics—Determination of the Melt Mass-Flow Rate (MFR) and the Melt Volume-Flow Rate (MVR) of Thermoplastics." The term "ISO 1133" as used herein refers to two procedures for the determination of the melt mass-flow rate (MFR) and the melt volume-flow rate (MVR) of thermoplastic materials under specified conditions of temperature and load. Procedure A is a mass-measurement method. Procedure B is a displacement-measurement method. These procedures were published as the Fourth Edition in 2005, the contents of which are incorporated herein by reference in its entirety.

ISO 1183-2 is entitled "Plastics—Methods for Determining the Density of Non-Cellular Plastics—Part 2: Density Gradient Column Method." The term "ISO 1183" as used herein refers to a gradient column method for the determination of the density of non-cellular moulded or extruded plastics in void-free form. Density gradient columns are columns containing a mixture of two liquids, the density in the column increasing uniformly from top to bottom. These procedures were published in 2004, the contents of which are incorporated herein by reference in its entirety.

In general embodiments, the present disclosure provides a polyolefin-based composition made from and/or containing a grafted polyolefin composition, a first polymer composition, and a polypropylene-containing blend composition.

In particular embodiments, (a) the grafted polyolefin composition is made from and/or contains a polyolefin grafted with an unsaturated monomer, (b) the first polymer composition is made from and/or contains a first polyolefin polymer, and (c) the polypropylene-containing blend composition is made from and/or contains a polypropylene-containing blend.

Preferably, the grafted polyolefin composition is present in an amount from about 1 to about 30 weight percent, relative to the total weight of the polyolefin-based composition. More preferably, the grafted polyolefin composition is present in an amount from about 10 to about 20 weight percent.

Suitable grafted polyolefins for use in making the grafted polyolefin composition include grafted polyolefins prepared by reacting polyolefins with unsaturated monomers at elevated temperatures, with or without a free-radical initiator, under conditions effective to graft unsaturated monomer units onto the polyolefin backbone. Preferably, the grafting reaction occurs under an inert gas, such as nitrogen.

Polyolefins suitable for making the grafted polyolefins include high density polyethylenes (HDPE), medium density polyethylenes (MDPE), low density polyethylenes (LDPE), linear low density polyethylenes (LLDPE), polypropylenes, ethylene-propylene copolymers, impact-modified polypropylenes, and the like, and blends thereof Suitable unsaturated monomers are also well known. Preferred unsaturated monomers are ethylenically unsaturated carboxylic acids and acid derivatives, particularly esters, anhydrides, acid salts, and the like. Examples include acrylic acid, methacrylic acid, maleic acid, fumaric acid, itaconic acid, citraconic acid, maleic anhydride, tetrahydrophthalic anhydride, norborn-5-ene-2,3-dicarboxylic acid anhydride, nadic anhydride, himic anhydride, and the like, and mixtures thereof. Maleic anhydride is particularly preferred. Other suitable unsaturated monomers are described in U.S. Pat. No. 6,385,777 and U.S. Patent Application Publication No. 2007/0054142, the teachings of which are incorporated herein by reference.

The relative amounts of polyolefin and unsaturated monomer used will vary and depend on factors such as the nature of the polyolefin and the unsaturated monomer, the desired tie-layer properties, the reaction conditions, the available equipment, and other factors. Usually, the unsaturated monomer is used in an amount within the range of about 0.1 to about 15 weight percent, based on the total weight of the grafted polyolefin, preferably from about 0.5 to about 6 weight percent, and most preferably from about 1 to about 3 weight percent.

Grafting of the unsaturated monomer(s) to the polyolefin is accomplished according to known procedures, generally by heating a mixture of the unsaturated monomer(s) and the polyolefin. Most typically, the grafted polyolefin is prepared by melt blending the polyolefin with the unsaturated monomer in a shear-imparting extruder/reactor. Twin screw extruders such as those marketed by Coperion under the designations ZSK-53, ZSK-83, ZSK-90 and ZSK-92 are especially useful for performing the grafting. A free-radical initiator such as an organic peroxide can be employed but is not necessary.

Grafting of the unsaturated monomer to the polyolefin is performed at elevated temperatures, preferably within the range of 180 degrees Celsius to 400 degrees Celsius, more preferably from 200 degrees Celsius to 375 degrees Celsius, and most preferably from 230 degrees Celsius to 350 degrees Celsius. Shear rates in the extruder can vary over a wide range, preferably from 30 to 1000 rpm, more preferably from 100 to 600 rpm, and most preferably from 200 to 400 rpm.

For such processes, the peroxide catalyst can be introduced into the molten propylene polymer before or after introduction of the grafting monomer. Because substantial amounts of solvent are to be avoided, the catalyst and grafting monomer are preferably added in neat form to the reactor. The monomer typically constitutes from about 1 to about 5 weight percent, relative to the total weight of the reaction mixture.

A temperature profile wherein the temperature is gradually increased over the length of the extruder/reactor up to a maximum in the grafting reaction zone and then decreases toward the reactor exit is preferred. Temperature attenuation is desirable for pelletizing purposes. The maximum temperature within the reactor should be such that significant vaporization losses and/or premature decomposition of peroxide catalyst is avoided. For example, with di-t-butyl peroxide and 2,5-dimethyl-2,5-di-(t-butylperoxy) hexane, maximum temperatures within the reactor should be maintained at or below about 260 degrees Celsius.

In contrast, the so-called "thermal" grafting processes which do not include catalysts, may use temperatures up to about 380 degrees Celsius. The maximum useful temperature varies with the selection of catalyst.

Examples of useful peroxide catalysts include: 1,1-bis (tert-butylperoxy)cyclohexane; n-butyl-4,4-bis(tert-butylperoxyvalerate); 1,1-bis(tert-butylperoxy)-3,3,5-trimethylcyclohexane; 2,2-bis(tert-butylperoxy)butane; dicumylperoxide; tert-butylcumylperoxide; α,α'-bis(tert-butylperoxypreoxy-isopropyl) benzene; di-tert-butylperoxide (DTBP); 2,5-dimethyl-2,5-di(tert-butylperoxy) hexane; and the like.

Additional details regarding the grafting procedure and reactor extruder are provided in U.S. Pat. No. 5,367,022 which is incorporated herein by reference in its entirety.

The functionalized propylene polymer component, obtained in accordance with the above-described grafting procedures, is a propylene-ethylene impact copolymer made from and/or containing crystalline (propylene homopolymer) and amorphous or rubber (ethylene-propylene copolymer) phases. Ethylene contents of the impact copolymers generally range from about 5 to about 30 weight percent, based upon the total weight of the impact copolymers, preferably from about 6 to about 25 weight percent. Thermoplastic polyolefins (TPOs) and thermoplastic elastomers (TPEs) are also encompassed within the above definition.

Preferably, the propylene-ethylene impact copolymer is a reactor-made intimate mixture of propylene homopolymer and ethylene-propylene copolymer produced in a gas-phase, stirred-bed, multi-stage polymerization process. Most typically, the mixture is produced in two reactors connected in series using high activity supported transition metal catalysts. The propylene homopolymer is produced in the first reactor and then introduced to the second reactor where additional propylene, ethylene, hydrogen and catalyst, as necessary, are metered to produce the intimate physical mixtures which comprise the propylene-ethylene impact copolymers utilized for the invention. Gas phase polymerizations of this type are described J. F. Ross & W. A. Bowles, "An Improved Gas-Phase Polypropylene Process," 24 Ind. Eng. Chem. Prod. Res. Dev. pp. 149-54 (1985), which is incorporated herein by reference in its entirety.

Functionalized propylene-ethylene impact copolymers having high graft monomer contents and relatively low MFRs can be obtained when high rubber content impact copolymers are grafted with maleic anhydride. More specifically, these impact copolymers have rubber contents from about 20 to about 35 weight percent, based upon the total weight of the impact copolymer and MWDs from about 4 to about 10. More preferably, the propylene-ethylene impact copolymers have rubber contents from about 20 to about 30 weight percent, based upon the total weight of the impact copolymer, and MWDs from about 4 to about 8.

Most preferably, the polyolefin grafted with an unsaturated monomer is a polypropylene grafted with maleic anhydride.

Preferably, the first polymer composition is present in an amount from about 10 to about 80 weight percent, relative to the total weight of the polyolefin-based composition. More preferably, the first polymer composition is present in an amount from about 50 to about 70 weight percent.

Suitable first polymers for use in making the first polymer composition include a first polyolefin polymer made from and/or containing one or more $C_2$ to $C_{10}$ α-olefin monomers. Preferably, the first polyolefin polymer is selected from the group consisting of polyethylenes, polypropylenes, polybutenes, the like, and mixtures thereof. More preferably, the first polyolefin polymer is selected from the group consisting of polyethylene polymers and polypropylene polymers.

Suitable polyethylenes include ethylene homopolymers, copolymers of ethylene with at least one $C_3$ to $C_{10}$ α-olefin, the like, and mixtures thereof. They include HDPE, LDPE, MDPE, LLDPE, the like, and mixtures thereof. Suitable polyethylene has a melt index ($MI_2$) preferably from about 0.01 to about 150 grams per 10 minutes, more preferably from about 0.01 to about 10 grams per 10 minutes, and most preferably from about 0.01 to about 5 grams per 10 minutes.

When the first polyolefin polymer is a polyethylene, the grafted polyolefin is preferably made from a polyethylene. More preferably, the grafted polyolefin is made from HDPE or LLDPE, and even more preferably, HDPE.

Suitable polypropylenes for use as a first polyolefin polymer include amorphous polypropylene, semicrystalline polypropylene, the like, and mixtures thereof. Preferably, the semicrystalline polypropylene is selected from the group consisting of propylene homopolymers, copolymers of propylene with at least one other $C_2$ to $C_{10}$ α-olefin, the like, and mixtures thereof. Copolymers of propylene include random copolymers and impact copolymers. Preferred α-olefins for such copolymers include ethylene, 1-butene, 1-pentene, 1-hexene, methyl-1-butenes, methyl-1-pentenes, 1-octene, 1-decene, the like, and mixtures thereof. Preferably, the semicrystalline polypropylene has a melt flow rate from about 0.001 to about 500 grams per 10 minutes. Preferably, the semicrystalline polypropylene has a density from about 0.897 to about 0.925 grams per cubic centimeter and a weight average molecular weight (Mw) within the range of 85,000 to 900,000.

Suitable polypropylenes are available commercially, including LyondellBasell PRO-FAX™ SR257M random copolymer polypropylene, having ethylene as the comonomer, a specific gravity of 0.90, a melt flow rate of 2.0 grams per 10 minutes, and a polydispersity index of 3.3.

When the first polyolefin polymer is a polypropylene, the grafted polyolefin is preferably made from a polypropylene. More preferably, the grafted polyolefin is made from random copolymer or an impact copolymer, and even more preferably, a impact copolymer.

Suitable polybutene includes homopolymers of 1-butene, copolymers of 1-butene with at least one other $C_2$ to $C_{10}$ α-olefin, the like, and mixtures thereof. Preferred α-olefins for such copolymers include ethylene, propylene, 1-pentene, 1-hexene, methyl-1-butenes, methyl-1-pentenes, 1-octene, 1-decene, the like, and mixtures thereof. The polybutene has a melt index preferably from about 0.01 to about 1000 grams per 10 minutes, more preferably from about 0.1 dg/min to about 750 grams per 10 minutes. Methods for producing polybutene are known. For instance, see U.S. Pat. No. 6,306,996, which is herein incorporated by reference in its entirety.

Preferably, the polypropylene-containing blend composition is present in an amount from about 10 to about 40 weight percent, relative to the total weight of the polyolefin-based composition. More preferably, the polypropylene-containing blend composition is present in an amount from about 20 to about 30 weight percent.

Suitable polypropylene-containing blends are made from and/or contain:
(a) from about 10 to about 90 weight percent a semicrystalline polypropylene and
(b) from about 10 to about 90 weight percent an ethylene propylene rubber having a total content of ethylene-derived units in an amount from about 20 to about 65 weight percent, based upon the total weight of the ethylene propylene rubber.

The ethylene propylene rubber of the polypropylene-containing blend can be an interpolymer further comprising one or more additional $C_4$ to $C_{10}$ α-olefins.

Preferably, the polypropylene-containing blend is made from and/or contains a heterophasic propylene-based copolymer, prepared by sequential polymerization in at least two stages and in the presence of Ziegler-Natta catalyst supported on a magnesium halide in active form, selected from the group consisting of
(a) an olefin polymer composition consisting essentially of
  (i) from about 10 to about 60 weight percent, based on the total weight of the olefin polymer composition, preferably from about 20 to about 50 weight percent, of
    (A) a propylene homopolymer with isotactic index in the range of about 90 to about 99 percent or
    (B) a crystalline propylene copolymer with ethylene, a $CH_2$=CHR olefin where R is a 2-8 carbon alkyl radical, or combinations thereof, containing from about 85 to about 99 weight percent of propylene, based on the weight of the crystalline propylene copolymer, and having an isotactic index in the range of about 85 to about 99 percent,
  (ii) from about 8 to about 40 weight percent, based on the total weight of the olefin polymer composition, of a semicrystalline, ethylene copolymer fraction containing ethylene and propylene, having from about 50 to about 99 weight percent of ethylene, based upon of the total weight of the semicrystalline, ethylene copolymer, and being insoluble in xylene at room temperature, and
  (iii) from about 30 to about 60 weight percent, based on the total weight of the olefin polymer composition, of an amorphous ethylene-propylene copolymer fraction, preferably from about 30 to about 50 weight percent, which
    (A) optionally, contains from about 1 to about 10 weight percent of a diene, based on the total weight of the amorphous ethylene-propylene copolymer fraction, more preferably from about 1 to about 5 weight percent,
    (B) is soluble in xylene at room temperature, and
    (C) contains about 40 to about 70 weight percent of ethylene, based on the total weight of the amorphous ethylene-propylene copolymer fraction, and
(b) an olefin polymer composition consisting essentially of
  (i) from about 10 to about 50 weight percent, based on the total weight of the olefin polymer composition, preferably from about 10 to about 40 weight percent, and most preferably from about 20 to about 35 weight percent, of
    (A) a propylene homopolymer having an isotactic index greater from about 80 to about 99 percent, preferably from about 85 to about 99 percent, or
    (B) a copolymer selected from the group consisting of
      (1) propylene and ethylene,
      (2) propylene, ethylene, and a $CH_2$=CHR alpha-olefin where R is a $C_{2-8}$ straight or branched alkyl, and
      (3) propylene and a $CH_2$=CHR alpha-olefin where R is a $C_{2-8}$ straight or branched alkyl,
      wherein the copolymer contains from about 80 to about 99 weight percent, based on the total weight of the copolymer, of propylene, preferably from about 85 to about 99 weight percent, and most preferably from about 90 to about 99 weight percent, and has an isotactic index from about 80 to about 99 percent, preferably from about 85 to about 99 percent,
  (ii) from 0 to about 20 weight percent, based on the total weight of the olefin polymer composition, of a copolymer fraction containing ethylene insoluble in xylene at room temperature, preferably from about 5 to about 20 weight percent, more preferably from about 7 to about 15 weight percent, and
  (iii) from about 40 to about 80 weight percent, based on the total weight of the olefin polymer composition, of a copolymer fraction, preferably from about 50 to about 70 weight percent, selected from the group consisting of a copolymer of
- (A) ethylene and propylene, wherein the copolymer contains from about 20 to about 40 weight percent, based upon the total weight of the copolymer, of ethylene, preferably from about 25 to about 38 weight percent,
- (B) ethylene, propylene, and a $CH_2$=CHR alpha-olefin where R is a $C_{2-8}$ straight or branched alkyl, the alpha-olefin is present in an amount from about 1 to about 10 weight percent, based upon the total weight of the copolymer, and the total weight of the ethylene and alpha-olefin together is from about 20 to about 40 weight percent, based upon the total weight of the copolymer, preferably from about 25 to about 38 weight percent, and
- (C) ethylene and a $CH_2$=CHR alpha-olefin where R is a $C_{2-8}$ straight or branched alkyl containing from about 20 to about 40 weight percent of the alpha-olefin, based on the total weight of the copolymer, which
  - (1) optionally, contains from about 0.5 to about 10 weight percent, based on the total weight of the copolymer, of a diene,
  - (2) is soluble in xylene at room temperature, and
  - (3) has an intrinsic viscosity of from about 1.5 to about 10.0 dl/g, preferably from about 1.5 to about 5.0 dl/g; more preferably from about 1.5 to about 4.0 dl/g, most preferably from about 1.7 to about 3.0 dl/g, wherein the total of the (bii) and (biii) fractions is from about 50 to about 90 weight percent, based on the total olefin polymer composition, preferably from about 65 to about 80 weight percent, and the weight ratio of (bii)/(biii) being from about 0.1 to about 0.4, preferably from about 0.1 to about 0.3.

Preferably, component (b)(ii) is selected from the group consisting of
(a) ethylene and propylene containing over about 55 weight percent, based on the total weight of the copolymer, of ethylene, preferably from about 55 weight percent to about 99 weight percent,
(b) ethylene, propylene, and a $CH_2$=CHR alpha-olefin where R is a $C_{2-8}$ straight or branched alkyl, containing from about 1 weight percent to about 10 weight percent, based on the total weight of the copolymer, of the alpha-olefin and from over about 55 weight percent to about 98 weight percent, based on the total weight of the copolymer, of the sum of the ethylene and alpha-olefin components, preferably from about 80 weight percent to about 95 weight percent, and
(c) ethylene and a $CH_2$=CHR alpha-olefin where R is a $C_{2-8}$ straight or branched alkyl, containing from over about 55 weight percent to about 98 weight percent, based on the total weight of the copolymer, of the alpha-olefin, preferably from about 80 weight percent to about 95 weight percent.

The polymerization process, which can be continuous or batch, is carried out following known techniques and operating in liquid phase, in the presence or not of inert diluent, or in gas phase, or by mixed liquid-gas techniques.

The stereospecific polymerization catalysts comprise the product of the reaction between: 1) a solid component, containing a titanium compound and an electron-donor compound (internal donor) supported on magnesium dihalide (preferably chloride); 2) an aluminum alkyl compound (cocatalyst); and, optionally, 3) an electron-donor compound (external donor).

Suitable polypropylene-containing blends are available commercially, including LyondellBasell's polymers under the tradenames CATALLOY™, ADFLEX™, HIFAX™, and SOFTELL™.

In some embodiments, the polyolefin-based composition is further made from and/or to contain an additives composition. Suitable examples include adhesion promoters, elastomeric polymers, UV inhibitors, antioxidants, thermal stabilizers, and the like. For some examples of these, see U.S. Pat. No. 6,835,777, which is incorporated herein by reference in its entirety.

In some embodiments, the present disclosure provides an adhesive made from and/or containing a polyolefin-based composition. In particular embodiments, the polyolefin-based composition is made from and/or contains
(a) from about 1 to about 30 weight percent of a grafted polyolefin composition, relative to the total weight of the polyolefin-based composition, comprising a polyolefin grafted with an unsaturated monomer,
(b) from about 10 to about 80 weight percent of a first polymer composition, relative to the total weight of the polyolefin-based composition, comprising a first polyolefin polymer,
(c) from about 10 to about 40 weight percent of a polypropylene-containing blend composition, relative to the total weight of the polyolefin-based composition, comprising a polypropylene-containing blend, and
(d) optionally, an additives composition having one or more additives.

The adhesives are particularly useful as a tie-layer for making multi-layer structures.

Tie-layer adhesives can be used in numerous multi-layer constructions, including structures having five, seven, nine, or more layers.

In some embodiments, the present disclosure provides a multi-layered structure made from and/or containing a tie-layer adhesive, wherein the tie-layer adhesive is made from and/or contains a polyolefin-based composition. A multi-layer structure can be made by many methods or processes, including by coextrusion, coating, and other laminating processes.

Multi-layer structures, typically made by coextrusion, frequently include a polyolefin layer such as PP, LDPE, LLDPE, HDPE, EVA, ethylene-acrylic acid copolymers, ethylene-methacrylic acid copolymers, ethylene-acrylic acid ester copolymers, ethylene-methacrylic acid ester copolymers, ionomers, and the like. Barrier resins used are typically polar polymers such as ethylene-vinyl alcohol (EVOH) or polyamide resins such as nylon.

Illustrative multi-layer constructions include the following:

PP/adhesive/EVOH/adhesive/PP
PP/adhesive/polyamide/adhesive/PP
PP/adhesive/polyamide/EVOH/polyamide/adhesive/PP
HDPE/adhesive/EVOH/adhesive/HDPE
HDPE/adhesive/polyamide/adhesive/HDPE
EVOH/adhesive/HDPE/adhesive/EVOH
LDPE/adhesive/polyamide/adhesive/LDPE
LDPE/adhesive/EVOH/adhesive/LDPE
LLDPE/adhesive/EVOH/adhesive/LLDPE
LLDPE/adhesive/polyamide/adhesive/LLDPE
HDPE/adhesive/polyamide/EVOH/polyamide/adhesive/HDPE Some commonly used sealable multilayer constructions include:
LLDPE/adhesive/EVOH/adhesive/sealant
HDPE/adhesive/polyamide/adhesive/sealant
HDPE/adhesive/EVOH/adhesive/sealant
where the sealant layer is, for example, EVA, LLDPE or ionomer.

Examples

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

For the comparative example and the examples of an embodiment of the present invention, a grafted polyolefin was prepared by feeding a polypropylene impact copolymer (specific gravity: 0.90; Melt Flow Rate: 1.8 grams per 10 minutes; Polydispersity Index: 9.7) and maleic anhydride (2 weight percent, based on total charged reactants) to a COPERION™ ZSK-92 twin-screw extruder having zones heated at temperatures ranging from 160 degrees Celsius to 192 degrees Celsius and operated at shear rates within the range of 300-400 rpm and under nitrogen. The extruder had eleven heating zones, which were heated as followed: zone 1 (160 degrees Celsius); zones 2-5 (143 degrees Celsius); zones 6-9 (195 degrees Celsius); and zones 9-11 (193 degrees Celsius).

The following materials were also used to prepare the exemplified polyolefin-based compositions and the corresponding test specimen: (1) LyondellBasell PRO-FAX™ SR257M random copolymer polypropylene, having ethylene as the comonomer, a specific gravity of 0.90, a melt flow rate of 2.0 grams per 10 minutes, and a polydispersity index of 3.3; (2) ExxonMobil Company's VISTALON™ 722 ethylene propylene rubber, having 72 weight percent ethylene recurring units, based upon the total weight of the EPR (Melt Index of 1.0 grams per 10 minutes); (3) LyondellBasell HIFAX™ CA10A polypropylene copolymer, having a density of 0.88 grams per cubic centimeter, a melt flow rate of 0.6 grams per 10 minutes, a rubber content of about 70 weight percent, and an ethylene content of 22 weight percent; (4) LyondellBasell HIFAX™ CA138A polypropylene copolymer, having a density of 0.88 grams per cubic centimeter, a melt flow rate of 2.8 grams per 10 minutes, a rubber content of about 55 weight percent, and an ethylene content of 30 weight percent; (5) LyondellBasell HIFAX™ CA207A polypropylene copolymer, having a density of 0.90 grams per cubic centimeter, a melt flow rate of 7.5 grams per 10 minutes, a rubber content of about 70 weight percent, an ethylene content of about 55 percent, and a butene content of about 10 weight percent; (6) LyondellBasell ADFLEX™ KS021P polypropylene copolymer, having a density of 0.88 grams per cubic centimeter, a melt flow rate of 0.9 grams per 10 minutes, a rubber content of about 60 weight percent, and an ethylene content of 40 weight percent; (7) LyondellBasell SOFTELL™ Q020F polypropylene copolymer, having a density of 0.87 grams per cubic centimeter, a melt flow rate of 0.60 grams per 10 minutes, a rubber content of about 85 weight percent, and an ethylene content of about 25 weight percent; (8) LyondellBasell ADFLEX™ Q200F polypropylene copolymer, having a density of 0.88 grams per cubic centimeter, a melt flow rate of 0.8 grams per 10 minutes, a rubber content of about 70 weight percent, and an ethylene content of 20 weight percent; (9) Ciba IRGANOX™ 1010 phenolic primary antioxidant; and (10) Ciba IRGAFOS™ 168 trisarylphosphite processing stabilizer.

The materials were admixed in the weight percents, based upon the total weight of the composition, shown in the table. Each composition contained 10 weight percent of the grafted polyolefin, 0.1 weight percent of Ciba IRGAFOS™ 168 trisarylphosphite processing stabilizer, and 0.1 weight percent of Ciba IRGANOX™ 1010 phenolic primary antioxidant, based upon the total weight of the composition.

For the comparative example and the examples of an embodiment, (a) the grafted polyolefin, (b) the first polyolefin polymer, (c) the polypropylene-containing blend composition, and (d) the additives were dry blended and then melt extruded at 230 degrees Celsius and 220 rpm to form tie-layer adhesives.

More specifically, five-layer structures (20 mils) were produced using the tie-layer adhesives of the comparative example (C. Ex. 1) and the inventive examples (Exs. 2-13). Each multi-layer structure was made on a Killion extruder (comprised of 3 extruders in this case) with a barrel length to barrel diameter (L/D) ratio of 24:1, a barrel diameter of about 2.54 cm (1 inch) to about 3.18 cm (1.25 inches), and 3 barrel heating zones. Killion extruders may be obtained from Killion Extruders, Inc. of Cedar Grove, N.J.

| Extruder | | | |
|---|---|---|---|
| Extruder | Barrel Diameter | XL:D Ratio | Heating Zones |
| Extruder 1 | 3.18 cm (1.25 inches) | 24:1 | 3 |
| Extruders 2 & 3 | 2.54 cm (1 inch) | 24:1 | 3 |

Each multi-layer structure has the following layers: PP/tie layer/EVOH/tie layer/PP.

The PP is PETROTHENE™ PP31KK01, a product of EQUISTAR™ Chemicals, LP, which has an Melt Flow Rate of 5 grams per 10 minutes at 230 degrees Celsius and density of 0.9 grams per cubic centimeter. The ethylene-vinyl alcohol copolymer (EVOH) is SOARNOL™ DC3203 FB grade, product of Nippon Gohsei™ Kagaku K. K., Japan.

The layer distribution was 43 thickness percent, 4 thickness percent, 6 thickness percent, 4 thickness percent, and 43 thickness percent, respectively based on total structure thickness.

TABLE I

| Component | C. Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|
| Grafted Polyolefin | 10 | 10 | 10 | 10 | 10 | 10 | 10 | 10 | 10 | 10 | 10 | 10 | 10 |
| SR257M | 69.8 | 69.8 | 64.8 | 69.8 | 64.8 | 69.8 | 64.8 | 69.8 | 64.8 | 69.8 | 64.8 | 69.8 | 64.8 |
| VISTALON 722 | 20 | — | — | — | — | — | — | — | — | — | — | — | — |
| CA10A | — | 20 | 25 | — | — | — | — | — | — | — | — | — | — |
| CA138A | — | — | — | 20 | 25 | — | — | — | — | — | — | — | — |

TABLE I-continued

| Component | C. Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|
| CA207A | — | — | — | — | — | 20 | 25 | — | — | — | — | — | — |
| KS021P | — | — | — | — | — | — | — | 20 | 25 | — | — | — | — |
| Q020F | — | — | — | — | — | — | — | — | — | 20 | 25 | — | — |
| Q200F | — | — | — | — | — | — | — | — | — | — | — | 20 | 25 |
| IRGAFOS 168 | 0.1 | 0.1 | 0.1 | 0.1 | 0.1 | 0.1 | 0.1 | 0.1 | 0.1 | 0.1 | 0.1 | 0.1 | 0.1 |
| IRGANOX 1010 | 0.1 | 0.1 | 0.1 | 0.1 | 0.1 | 0.1 | 0.1 | 0.1 | 0.1 | 0.1 | 0.1 | 0.1 | 0.1 |
| Adhesion (1 Day) kg/cm (lb/in) | 0.838 (4.69) | 1.331 (7.45) | 1.900 (10.64) | 1.568 (8.78) | 1.131 (6.33) | 1.766 (9.89) | 2.045 (11.45) | 1.765 (9.88) | 1.806 (10.11) | 1.806 (10.11) | 1.927 (10.79) | 1.684 (9.43) | 1.809 (10.13) |

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of the ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A polyolefin-based composition comprising:
   (a) a polypropylene grafted with maleic anhydride;
   (b) a polymer composition comprising 10-90% by weight of a semicrystalline polypropylene having a crystallinity of more than about 30% by weight and less than about 70% by weight and 10-90% by weight of an ethylene propylene rubber copolymer comprising an ethylene content of about 20-65% by weight, based on the total weight of the ethylene propylene rubber.

2. An adhesive comprising the polyolefin-based composition of claim 1.

3. A multi-layered structure comprising the adhesive of claim 2.

* * * * *

UNITED STATES PATENT AND TRADEMARK OFFICE
CERTIFICATE OF CORRECTION

PATENT NO. : 9,803,074 B2  
APPLICATION NO. : 14/645488  
DATED : October 31, 2017  
INVENTOR(S) : Maged G. Botros et al.

Page 1 of 1

It is certified that error appears in the above-identified patent and that said Letters Patent is hereby corrected as shown below:

In the Specification

Column 6     Line 56     After "thereof", insert --.--

Column 9     Line 16     Delete "(Mw)" and insert --($M_w$)--

In the Claims

Column 16     Line 24     In Claim 1, after "70% by weight", insert --;--

Signed and Sealed this  
Third Day of March, 2020

Andrei Iancu  
*Director of the United States Patent and Trademark Office*